US012382097B2

United States Patent
Zaghetto et al.

(10) Patent No.: US 12,382,097 B2
(45) Date of Patent: Aug. 5, 2025

(54) INTER-FRAME ATTRIBUTE CODING IN GEOMETRY-BASED DYNAMIC POINT CLOUDS COMPRESSION

(71) Applicants: SONY GROUP CORPORATION, Tokyo (JP); Sony Corporation of America, New York, NY (US)

(72) Inventors: Alexandre Zaghetto, San Jose, CA (US); Danillo Graziosi, Flagstaff, AZ (US); Ali Tabatabai, Cupertino, CA (US)

(73) Assignees: Sony Group Corporation, Tokyo (JP); Sony Corporation of America, New York, NY (US)

( * ) Notice: Subject to any disclaimer, the term of this patent is extended or adjusted under 35 U.S.C. 154(b) by 129 days.

(21) Appl. No.: 18/374,848

(22) Filed: Sep. 29, 2023

(65) Prior Publication Data

US 2024/0357163 A1 Oct. 24, 2024

Related U.S. Application Data

(60) Provisional application No. 63/496,969, filed on Apr. 19, 2023.

(51) Int. Cl.
*H04N 7/12* (2006.01)
*H04N 19/159* (2014.01)
*H04N 19/172* (2014.01)
*H04N 19/186* (2014.01)
*H04N 19/597* (2014.01)

(52) U.S. Cl.
CPC ......... *H04N 19/597* (2014.11); *H04N 19/159* (2014.11); *H04N 19/172* (2014.11); *H04N 19/186* (2014.11)

(58) Field of Classification Search
CPC .................................................... H04N 19/159
See application file for complete search history.

(56) References Cited

PUBLICATIONS

The International Search Report dated Jun. 10, 2024, for Application No. PCT/IB2024/053208.
Anique Akhtar, et al., "Dynamic Point Cloud Geometry Compression Using Spars Convolutions", No. M59617, Apr. 20, 2022, XP030301808, https://dms.mpeg.expert/doc_and_user/documents/138_OnLine/wg11/m59617-v2-m59617-v2.zip m59617-v2.docx.
Anique Akhtar, et al., [AI-3dgc] [EES.3-related] Updated on baseline attribute compression for ML-based PCC, 141.MPEG Meeting; Jan. 16, 2023-Jan. 20, 2023; No. m62180, Jan. 18, 2023, XP030308005, //https:dms.mpeg.expert/doc_end_user/documents/141_Online/wg11/m62180-v1-262180_v1.zip.
Satoru Kuma (Sony) et al., "PCC CE1.3 recolor method" 122. MPEG Meeting; Apr. 16, 2018-Apr. 20, 2018; San Diego; No. m42538, Apr. 11, 2018, XP030070877, http:// phenix.int.evry.fr/mpeg/doc_end user/documents/122_San%20Diego/wg11/m42538-v1-m42538.zip m42538_PCC_CE1.3R0.DOCX.

*Primary Examiner* — Young Lee
(74) *Attorney, Agent, or Firm* — Haverstock & Owens, A Law Corporation

(57) ABSTRACT

An attribute prediction and compensation scheme for geometry-based dynamic point cloud compression is described herein. A combination of multiple reference frames are able to be used as a predictor for current frames. The method described herein improves efficiency and accuracy.

19 Claims, 3 Drawing Sheets

INTER-FRAME ATTRIBUTE CODING IN GEOMETRY-BASED DYNAMIC POINT CLOUDS COMPRESSION

CROSS-REFERENCE TO RELATED APPLICATION(S)

This application claims priority under 35 U.S.C. § 119(e) of the U.S. Provisional Patent Application Ser. No. 63/496,969, filed Apr. 19, 2023 and titled, "INTER-FRAME ATTRIBUTE CODING IN GEOMETRY-BASED DYNAMIC POINT CLOUDS COMPRESSION," which is hereby incorporated by reference in its entirety for all purposes.

FIELD OF THE INVENTION

The present invention relates to three dimensional graphics. More specifically, the present invention relates to dynamic mesh coding.

BACKGROUND OF THE INVENTION

Geometry-based Point Cloud Compression (G-PCC) is being developed under coordinated test model (TMC13) study. G-PCC addresses the compression of point clouds in both Category 1 (static point clouds) and Category 3 (dynamically acquired point clouds). Motion-compensated inter-frame prediction is introduced into the Region-adaptive Hierarchical Transform (RAHT) encoding scheme.

In MPEG142, inter prediction for RAHT attribute coding was adopted in G-PCCv2 and TMC13. In this method, in the encoding of the target node, the residual value of the coefficient is calculated by using the coefficient of the reference frame and the current frame, and residual value is coded. Inter-prediction is applied only if the current point cloud and reference point cloud has the same position node. If the predictive coefficient value does not exist in the reference buffer, inter-prediction is not applied.

A method based on RAHT is being discussed in MPEG. It is limited to RAHT and is performed in the transformed domain. In summary, it encodes the residue of the transform coefficients between each node of the reference frame and the current frame. The limitations are: (1) it applies only to RAHT attribute coding; (2) it is restricted to the transformed coefficients domain; (3) geometry slicing used before attribute transform may cause unpredicted misalignment between nodes, resulting in non-compression-friendly residues.

SUMMARY OF THE INVENTION

An attribute prediction and compensation scheme for geometry-based dynamic point cloud compression is described herein. A combination of multiple reference frames are able to be used as a predictor for current frames. The method described herein improves efficiency and accuracy.

In one aspect, a method programmed in a non-transitory memory of a device comprises encoding and decoding a first frame to generate a reconstructed first frame and encoding a second frame based on the reconstructed first frame. The reconstructed first frame includes reconstructed attribute information and reconstructed position information. The method comprises predicting attribute information of the second frame from the reconstructed first frame. The method comprises generating a predictor with a same position information as the second frame and a same number of points as the second frame, wherein attribute information is based on a color transfer performed from the reconstructed first frame to positions of the second frame. The method comprises computing a residue by subtracting the attribute information of the predictor from the attribute information of the second frame. The method comprises encoding and decoding the residue to generate a reconstructed residue with the attribute information and the position information. The method comprises generating a reconstructed predictor, wherein a color from the first frame is transferred to the reconstructed predictor. The method comprises adding the reconstructed residue to the reconstructed predictor to generate new attribute information and new position information.

In another aspect, an apparatus comprises a non-transitory memory for storing an application, the application for: encoding and decoding a first frame to generate a reconstructed first frame and encoding a second frame based on the reconstructed first frame and a processor coupled to the memory, the processor configured for processing the application. The reconstructed first frame includes reconstructed attribute information and reconstructed position information. The application is further configured for predicting attribute information of the second frame from the reconstructed first frame. The application is further configured for generating a predictor with a same position information as the second frame and a same number of points as the second frame, wherein attribute information is based on a color transfer performed from the reconstructed first frame to positions of the second frame. The application is further configured for computing a residue by subtracting the attribute information of the predictor from the attribute information of the second frame. The application is further configured for encoding and decoding the residue to generate a reconstructed residue with the attribute information and the position information. The application is further configured for generating a reconstructed predictor, wherein a color from the first frame is transferred to the reconstructed predictor. The application is further configured for adding the reconstructed residue to the reconstructed predictor to generate new attribute information and new position information.

In another aspect, a method programmed in a non-transitory memory of a device comprises encoding a current frame based on one or more previous frames or one or more future frames, wherein the attribute information of the current frame is based on the attribute information of the one or more previous frames or one or more future frames. The attribute information is based on a color transfer performed from the one or more previous frames or the one or more future frames. The method comprises computing a residue by subtracting the attribute information of a predictor from the attribute information of the current frame. The method comprises encoding and decoding the residue to generate a reconstructed residue with the attribute information and the position information. The method comprises generating a reconstructed predictor, wherein a color from the one or more previous frames or the one or more future frames is transferred to the reconstructed predictor. The method comprises adding the reconstructed residue to the reconstructed predictor to generate new attribute information and new position information.

DETAILED DESCRIPTION OF THE PREFERRED EMBODIMENT

An attribute prediction and compensation scheme for geometry-based dynamic point cloud compression is described herein. A combination of multiple reference frames are able to be used as a predictor for current frames, but for simplicity an instance using a single reference frame is used to illustrate the method.

At the encoder side, consider a reference frame $F_0$ and a current frame $F_1$. First the reference frame $F_0$ is intra-coded using any attribute coding scheme, such as G-PCC's RAHT or Predicting-lifting transform, and transmitted to the decoder. The reference frame $F_0$ is reconstructed at the encoder side, resulting in $F'_0$. The reconstructed attributes of $F'_0$ are transferred to the geometry of the current frame $F_1$ and a predictor $P_1$ is generated. A residue point cloud $R_1$ is generated by subtracting the attributes of $P_1$ from the attributes of $F_1$ at the irrespective collocated coordinates. The residue $R_1$ is also encoded and transmitted to the decoder. The decoder decodes $F'_0$ and $R'_1$. The attributes attached to $F'_0$ are transferred to the geometry of $R'_1$, generating $P'_1$. The collocated attributes of $R'_1$ and $P'_1$ are added, resulting in the decoded current frame $F'_1$.

Groups of frames with different numbers of frames and prediction schemes that use one or multiple past and future frames are possible. Different global and local point cloud matching strategies can be used to improve attribute transfer, optimize the generation of the predictor, and therefore, provide more compression-friendly residues.

The method enables prediction-based inter-frame attribute coding in geometry-based dynamic point clouds compression. Prediction of attributes is performed in the attribute domain and can be used as input to any attribute transform, such as G-PCC's RAHT and Predicting-Lifting transforms; the predictor is based on the entire point cloud frame, not suffering from misalignment caused by point cloud slicing that some codecs, such as G-PCC, implement.

Figure 1:
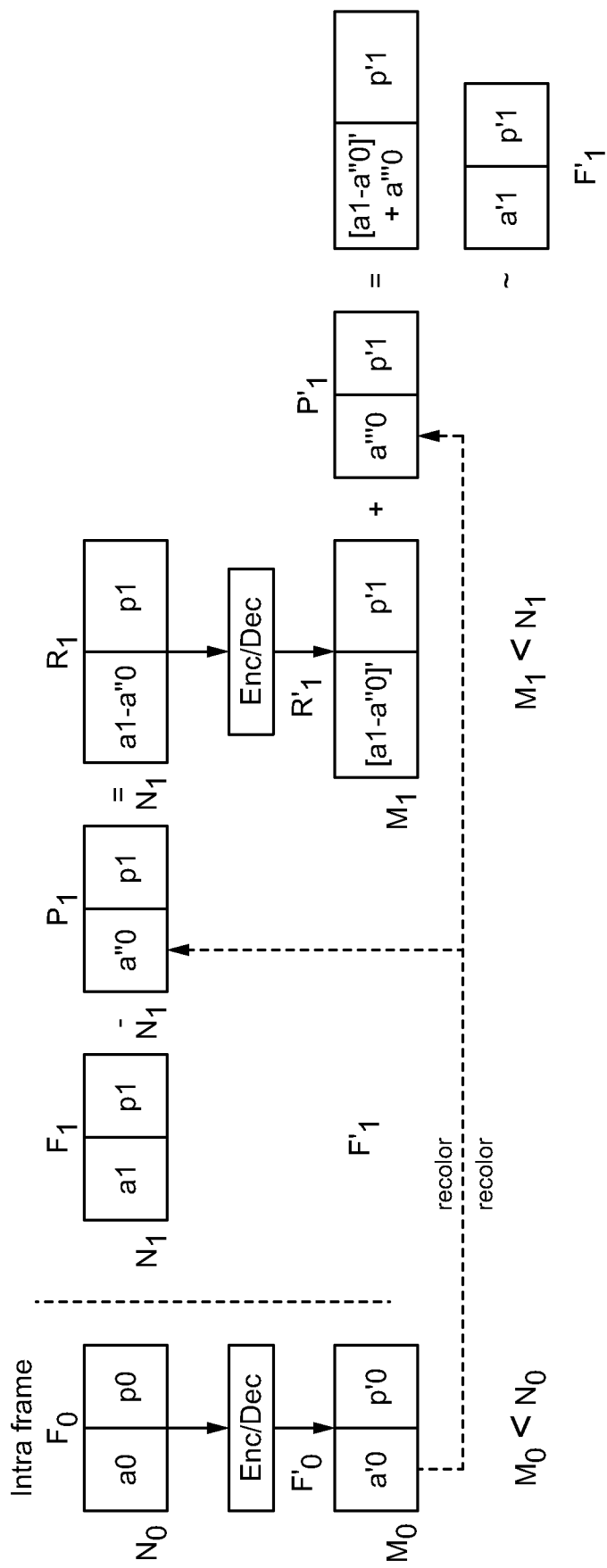
FIG. 1 illustrates an exemplary diagram of inter-frame attribute prediction in Geometry-based Point Cloud Compression (G-PCC) according to some embodiments.

FIG. 1 illustrates an exemplary diagram of inter-frame attribute prediction in Geometry-based Point Cloud Compression (G-PCC) according to some embodiments. Frame 0 ($F_0$) and Frame 1 ($F_1$) are shown (e.g., two consecutive frames). Frame 0 includes attribute information for Frame 0, position information for Frame 0, and No points. The information from Frame 0 is able to be used to perform a prediction for Frame 1, and to encode only the residue of the two frames.

Frame 0 is encoded and decoded to generate a reconstructed Frame 0 ($F'_0$). The reconstructed Frame 0 has reconstructed attribute information (a'0), reconstructed position information (p'0), and $M_0$ points, where $M_0 < N_0$.

After Frame 0 is encoded and reconstructed, then Frame 1 is encoded. Frame 1 has different attribute information (a1), position information (p1), and a different number of points ($N_1$). The reconstructed Frame 0 is used to predict the attribute information of Frame 1. A predictor ($P_1$) has the same position information (p1) as Frame 1 and the same number of points ($N_1$) as Frame 1, but for the attribute information (a"0), a color transfer is performed from the reconstructed Frame 0 to the positions of Frame 1. In other words, Frame 1 is recolored based on the colors of the reconstructed Frame 0. A residue ($R_1$) is computed by subtracting the attribute information (a"0) of the predictor from the attribute information (a1) of Frame 1 (e.g., a1-a"0). For the residue, the position information (p1) and number of points ($N_1$) are still the same. The residue ($R_1$) is then encoded and decoded to generate a reconstructed residue ($R'_1$) with attribute information ([a1-a"0]'), position information (p'1) and $M_1$ points, where $M_1 < N_1$.

Then, the color from Frame 0 is transferred to the estimated $P_1$ (also referred to as a reconstructed predictor ($P'_1$)). The reconstructed residue ($R'_1$) is added to the reconstructed predictor (P'1) to generate attribute information ([a1-a"0]'+ a'"0) and position information (p'1), which is an approximation of the encoded and decoded Frame 1 ($F'_1$), with attribute information a'1 and position information p'1.

In other words, the color of the reconstructed Frame 0 is transferred to Frame 1, and then the residual is determined which is encoded instead of Frame 1. Once the residue is recovered, the color is transferred from the reconstructed Frame 0 to the geometry of the residue to reconstruct and recover the point cloud (Frame 1).

Any recoloring method is able to be utilized. For example, a nearest neighbor coloring is able to be implemented, where the color of the nearest neighbor is used in the target point cloud to be used as a predictor. G-PCC includes a recoloring implementation which involves analyzing/searching the neighborhood and additional information to perform recoloring. Other neighborhood analyzing/searching and motion estimation are able to be used to obtain the coloring from a previous point cloud.

Figure 2:
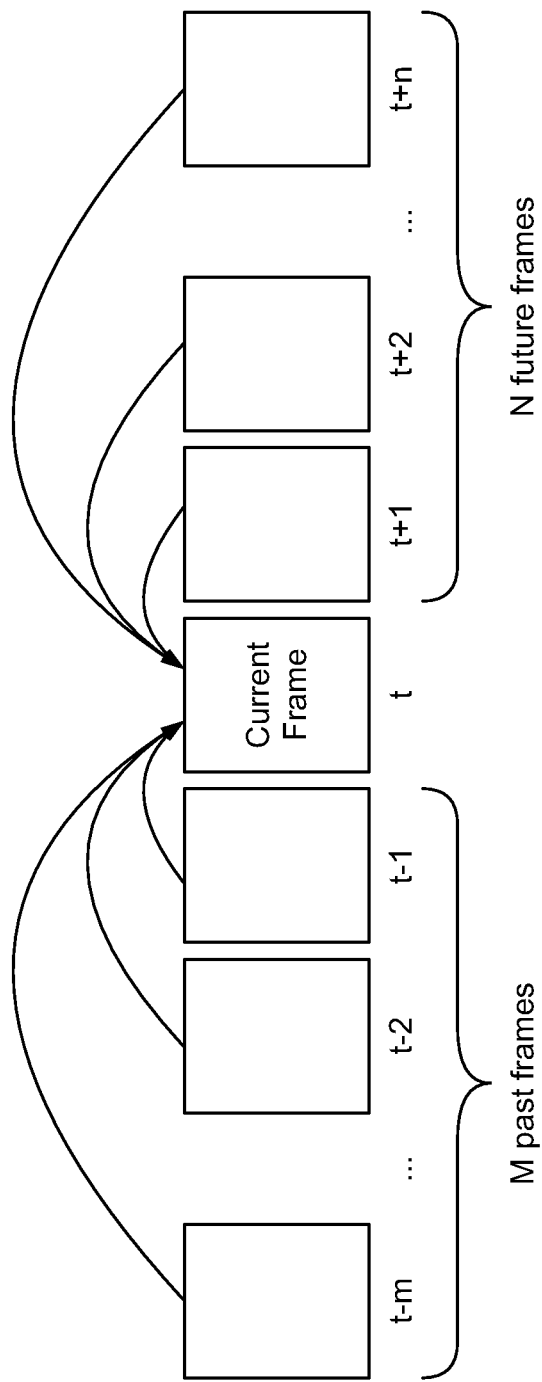
FIG. 2 illustrates a diagram of exemplary prediction schemes according to some embodiments.

FIG. 2 illustrates a diagram of exemplary prediction schemes according to some embodiments. For a current frame, any past or future frames are able to be used to generate a predictor. For example, instead of using one frame to generate a predictor, M past frames are able to be used, N future frames are able to be used, or any combination thereof are able to be used. Furthering the example, the attribute of the predictor is able to be based on the average attribute based on past frames and future frames.

Figure 3:
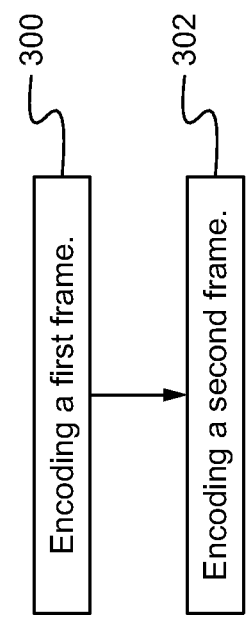
FIG. 3 illustrates a flowchart of a method of inter-frame attribute coding according to some embodiments.

FIG. 3 illustrates a flowchart of a method of inter-frame attribute coding according to some embodiments. In the step 300, a first frame is encoded and decoded to generate a reconstructed frame. The reconstructed first frame has reconstructed attribute information and reconstructed position information.

In the step 302, a second frame is encoded. The reconstructed first frame is used to predict the attribute information of the second frame. A predictor has the same position information as the second frame and the same number of points as the second frame, but for the attribute information, a color transfer is performed from the reconstructed first frame to the positions of the second frame. A residue is computed by subtracting the attribute information of the predictor from the attribute information of the second frame. For the residue, the position information and number of points are still the same. The residue is then encoded and decoded to generate a reconstructed residue with the attribute information and the position information. Then, the color from the first frame is transferred to the reconstructed predictor. The reconstructed residue is added to the reconstructed predictor to generate attribute information and position information, which is an approximation of the encoded and decoded second frame, with attribute information and position information. The process continues for additional frames (e.g., a third frame, a fourth frame and so on). In some embodiments, instead of using a first frame for recoloring and prediction of the second frame, other frames are utilized (e.g., prior frames, future frames, or a combination thereof). In some embodiments, additional or fewer steps are implemented. In some embodiments, the order of the steps is modified.

Figure 4:
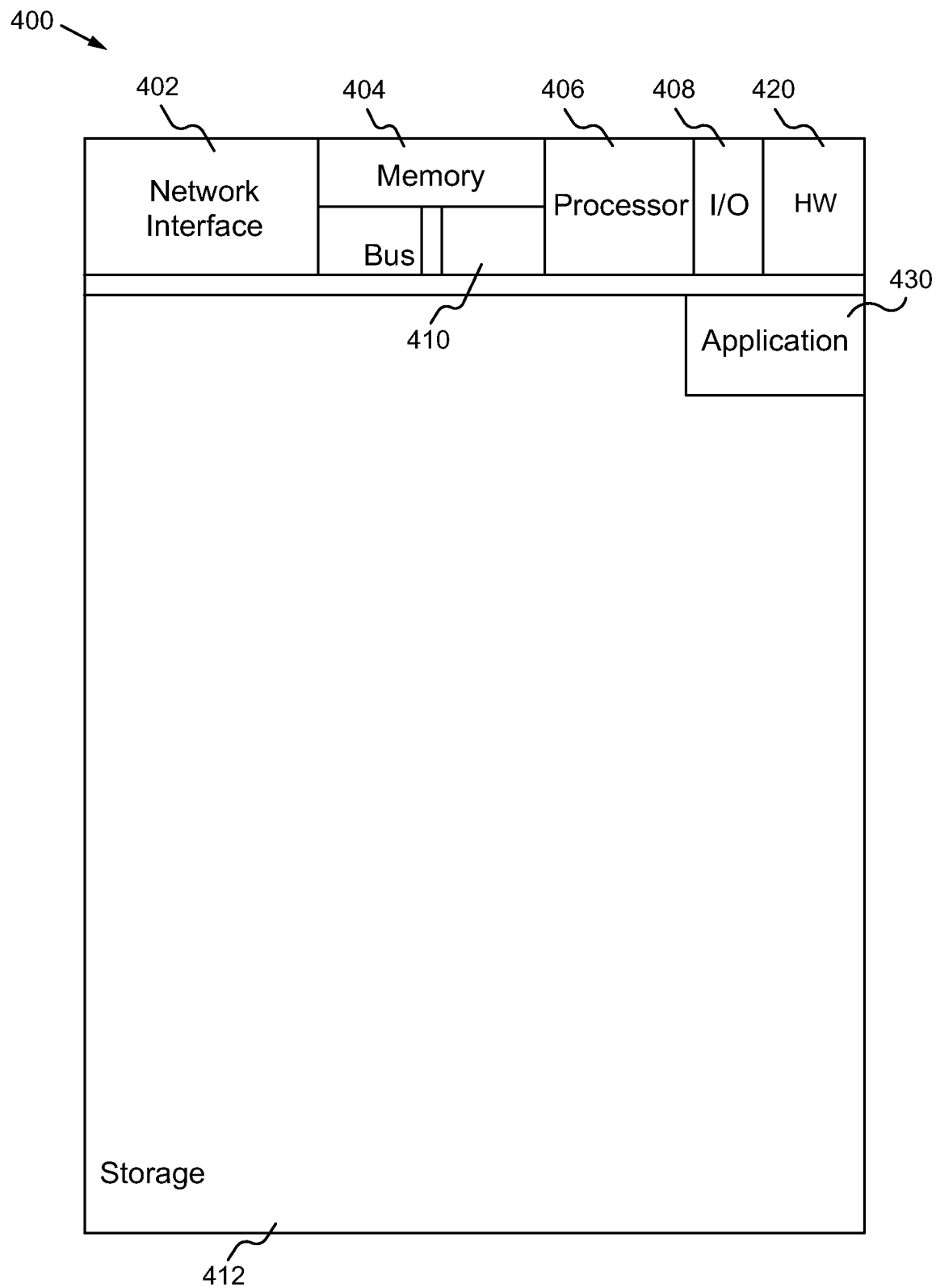
FIG. 4 illustrates a block diagram of an exemplary computing device configured to implement the inter-frame attribute coding method according to some embodiments.

FIG. 4 illustrates a block diagram of an exemplary computing device configured to implement the inter-frame attribute coding method according to some embodiments. The computing device 400 is able to be used to acquire, store, compute, process, communicate and/or display information such as images and videos including 3D content. The computing device 400 is able to implement any of the encoding/decoding aspects. In general, a hardware structure suitable for implementing the computing device 400 includes a network interface 402, a memory 404, a processor 406, I/O device(s) 408, a bus 410 and a storage device 412. The choice of processor is not critical as long as a suitable processor with sufficient speed is chosen. The memory 404 is able to be any conventional computer memory known in the art. The storage device 412 is able to include a hard drive, CDROM, CDRW, DVD, DVDRW, High Definition disc/drive, ultra-HD drive, flash memory card or any other storage device. The computing device 400 is able to include one or more network interfaces 402. An example of a network interface includes a network card connected to an Ethernet or other type of LAN. The I/O device(s) 408 are able to include one or more of the following: keyboard, mouse, monitor, screen, printer, modem, touchscreen, button interface and other devices. Inter-frame attribute coding application(s) 430 used to implement the inter-frame attribute coding method are likely to be stored in the storage device 412 and memory 404 and processed as applications are typically processed. More or fewer components shown in FIG. 4 are able to be included in the computing device 400. In some embodiments, inter-frame attribute coding hardware 420 is included. Although the computing device 400 in FIG. 4 includes applications 430 and hardware 420 for the inter-frame attribute coding method, the inter-frame attribute coding method is able to be implemented on a computing device in hardware, firmware, software or any combination thereof. For example, in some embodiments, the inter-frame attribute coding applications 430 are programmed in a memory and executed using a processor. In another example, in some embodiments, the inter-frame attribute coding hardware 420 is programmed hardware logic including gates specifically designed to implement the inter-frame attribute coding method.

In some embodiments, the inter-frame attribute coding application(s) 430 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the inter-frame attribute coding method, a device acquires or receives 3D content (e.g., point cloud content). The inter-frame attribute coding method is able to be implemented with user assistance or automatically without user involvement.

In operation, the inter-frame attribute coding method improves efficiency by encoding the residue instead of the frame and is more accurate when compared to other efficiency implementations. Additionally, the inter-frame attribute coding method does not operate in the transform domain which avoids other potential issues.

When G-PCC encoding is performed, there are a large number of points, and the codec slices the point cloud into sub-points. Each slice has a specific number of sub-points. An optree is built for each slice independently. If there are two consecutive frames, and an optree is built for a slice in a reference point cloud, and an optree is built for a slice in a current frame, the two slices may not correspond spatially. Slice 0 from frame 0 does not necessarily correspond with slice 0 from frame 1. Then, the optrees may not have any correspondence, so the attribute transform on these two structures may not have any power of prediction. This will result in poor prediction with a very high residual. However, by recoloring the point cloud before any transformation, optree building and slicing, the color goes to the appropriate position.

Some Embodiments of Inter-Frame Attribute Coding in Geometry-Based Dynamic Point Clouds Compression 1. A method programmed in a non-transitory memory of a device comprising:
    encoding and decoding a first frame to generate a reconstructed first frame; and
    encoding a second frame based on the reconstructed first frame.
2. The method of clause 1 wherein the reconstructed first frame includes reconstructed attribute information and reconstructed position information.
3. The method of clause 1 further comprising predicting attribute information of the second frame from the reconstructed first frame.
4. The method of clause 1 further comprising generating a predictor with a same position information as the second frame and a same number of points as the second frame, wherein attribute information is based on a color transfer performed from the reconstructed first frame to positions of the second frame.
5. The method of clause 4 further comprising computing a residue by subtracting the attribute information of the predictor from the attribute information of the second frame.
6. The method of clause 5 further comprising encoding and decoding the residue to generate a reconstructed residue with the attribute information and the position information.
7. The method of clause 6 further comprising generating a reconstructed predictor, wherein a color from the first frame is transferred to the reconstructed predictor.
8. The method of clause 7 further comprising adding the reconstructed residue to the reconstructed predictor to generate new attribute information and new position information.
9. An apparatus comprising:
    a non-transitory memory for storing an application, the application for:

encoding and decoding a first frame to generate a reconstructed first frame; and encoding a second frame based on the reconstructed first frame; and a processor coupled to the memory, the processor configured for processing the application.

10. The apparatus of clause 9 wherein the reconstructed first frame includes reconstructed attribute information and reconstructed position information.

11. The apparatus of clause 9 wherein the application is further configured for predicting attribute information of the second frame from the reconstructed first frame.

12. The apparatus of clause 9 wherein the application is further configured for generating a predictor with a same position information as the second frame and a same number of points as the second frame, wherein attribute information is based on a color transfer performed from the reconstructed first frame to positions of the second frame.

13. The apparatus of clause 12 wherein the application is further configured for computing a residue by subtracting the attribute information of the predictor from the attribute information of the second frame.

14. The apparatus of clause 13 wherein the application is further configured for encoding and decoding the residue to generate a reconstructed residue with the attribute information and the position information.

15. The apparatus of clause 14 wherein the application is further configured for generating a reconstructed predictor, wherein a color from the first frame is transferred to the reconstructed predictor.

16. The apparatus of clause 15 wherein the application is further configured for adding the reconstructed residue to the reconstructed predictor to generate new attribute information and new position information.

17. A method programmed in a non-transitory memory of a device comprising:

encoding a current frame based on one or more previous frames or one or more future frames, wherein the attribute information of the current frame is based on the attribute information of the one or more previous frames or one or more future frames.

18. The method of clause 17 wherein the attribute information is based on a color transfer performed from the one or more previous frames or the one or more future frames.

19. The method of clause 17 further comprising computing a residue by subtracting the attribute information of a predictor from the attribute information of the current frame.

20. The method of clause 19 further comprising encoding and decoding the residue to generate a reconstructed residue with the attribute information and the position information.

21. The method of clause 20 further comprising generating a reconstructed predictor, wherein a color from the one or more previous frames or the one or more future frames is transferred to the reconstructed predictor.

22. The method of clause 21 further comprising adding the reconstructed residue to the reconstructed predictor to generate new attribute information and new position information.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:

encoding and decoding a first frame to generate a reconstructed first frame;

encoding a second frame based on the reconstructed first frame; and generating a predictor with a same position information as the second frame and a same number of points as the second frame, wherein attribute information is based on a color transfer performed from the reconstructed first frame to positions of the second frame.

2. The method of claim 1 wherein the reconstructed first frame includes reconstructed attribute information and reconstructed position information.

3. The method of claim 1 further comprising predicting attribute information of the second frame from the reconstructed first frame.

4. The method of claim 1 further comprising computing a residue by subtracting the attribute information of the predictor from the attribute information of the second frame.

5. The method of claim 4 further comprising encoding and decoding the residue to generate a reconstructed residue with the attribute information and the position information.

6. The method of claim 5 further comprising generating a reconstructed predictor, wherein a color from the first frame is transferred to the reconstructed predictor.

7. The method of claim 6 further comprising adding the reconstructed residue to the reconstructed predictor to generate new attribute information and new position information.

8. An apparatus comprising:

a non-transitory memory for storing an application, the application for:

encoding and decoding a first frame to generate a reconstructed first frame;

encoding a second frame based on the reconstructed first frame; and generating a predictor with a same position information as the second frame and a same number of points as the second frame, wherein attribute information is based on a color transfer performed from the reconstructed first frame to positions of the second frame; and a processor coupled to the memory, the processor configured for processing the application.

9. The apparatus of claim 8 wherein the reconstructed first frame includes reconstructed attribute information and reconstructed position information.

10. The apparatus of claim 8 wherein the application is further configured for predicting attribute information of the second frame from the reconstructed first frame.

11. The apparatus of claim 8 wherein the application is further configured for computing a residue by subtracting the attribute information of the predictor from the attribute information of the second frame.

12. The apparatus of claim 11 wherein the application is further configured for encoding and decoding the residue to generate a reconstructed residue with the attribute information and the position information.

13. The apparatus of claim 12 wherein the application is further configured for generating a reconstructed predictor, wherein a color from the first frame is transferred to the reconstructed predictor.

14. The apparatus of claim 13 wherein the application is further configured for adding the reconstructed residue to the reconstructed predictor to generate new attribute information and new position information.

15. A method programmed in a non-transitory memory of a device comprising:
- encoding a current frame based on one or more previous frames or one or more future frames, wherein the attribute information of the current frame is based on the attribute information of the one or more previous frames or one or more future frames; and
- generating a reconstructed predictor, wherein a color from the one or more previous frames or the one or more future frames is transferred to the reconstructed predictor.

16. The method of claim 15 wherein the attribute information is based on a color transfer performed from the one or more previous frames or the one or more future frames.

17. The method of claim 15 further comprising computing a residue by subtracting the attribute information of a predictor from the attribute information of the current frame.

18. The method of claim 17 further comprising encoding and decoding the residue to generate a reconstructed residue with the attribute information and the position information.

19. The method of claim 15 further comprising adding the reconstructed residue to the reconstructed predictor to generate new attribute information and new position information.

* * * * *